United States Patent [19]

Gahleitner et al.

[11] Patent Number: 5,705,568
[45] Date of Patent: Jan. 6, 1998

[54] POLYPROPYLENES OBTAINABLE BY CHEMICAL DEGRADATION

[75] Inventors: Markus Gahleitner, Neuhofen; Klaus Bernreitner, Linz; Norbert Hafner, Linz; Rudolf Wölfer, Linz; Wolfgang Neissl, Neulichtenberg, all of Austria

[73] Assignee: PCD Polymere Gesellschaft m.b.H., Schwechat-Mannsworth, Austria

[21] Appl. No.: 685,758

[22] Filed: Jul. 24, 1996

Related U.S. Application Data

[63] Continuation of Ser. No. 253,303, Jun. 3, 1994, abandoned.

[30] Foreign Application Priority Data

Jun. 7, 1993 [AT] Austria .................... 1099/93

[51] Int. Cl.$^6$ .................................... C08F 8/50
[52] U.S. Cl. ................... 525/194; 524/525; 524/528; 524/576; 525/333.8; 525/387
[58] Field of Search .................... 525/194, 333.8, 525/387; 524/525, 528, 576

[56] References Cited

U.S. PATENT DOCUMENTS

| | | |
|---|---|---|
| 3,144,436 | 8/1964 | Greene et al. |
| 3,480,580 | 11/1969 | Joyner et al. |
| 4,335,225 | 6/1982 | Collette et al. |
| 4,451,589 | 5/1984 | Morman et al. |
| 4,774,293 | 9/1988 | Beijleveld et al. |
| 4,833,209 | 5/1989 | Beijleveld et al. |
| 4,916,198 | 4/1990 | Scheve et al. |
| 5,047,485 | 9/1991 | DeNicola, Jr. |

FOREIGN PATENT DOCUMENTS

| | | |
|---|---|---|
| 319 589 | 12/1974 | Austria . |
| 0 063 654 | 11/1982 | European Pat. Off. |
| 0063654 | 11/1982 | European Pat. Off. |
| 0 208 330 | 1/1987 | European Pat. Off. |
| 0 232 201 | 8/1987 | European Pat. Off. |
| 0 475 306 | 3/1992 | European Pat. Off. |
| 0 475 307 | 3/1992 | European Pat. Off. |
| 0497590 | 8/1992 | European Pat. Off. |
| 2 367 082 | 5/1978 | France . |
| 1 495 275 | 3/1969 | Germany . |
| 1495275 | 3/1969 | Germany . |
| 28 30 160 | 1/1979 | Germany . |
| 31 05 830 | 9/1982 | Germany . |
| 34 01 612 | 7/1984 | Germany . |
| 34 02 892 | 8/1984 | Germany . |
| 37 42 845 | 7/1989 | Germany . |
| 1 070 138 | 1/1984 | U.S.S.R. |
| 1442681 | 7/1976 | United Kingdom . |
| 2 100 268 | 12/1982 | United Kingdom . |
| 2134122 | 8/1984 | United Kingdom . |

OTHER PUBLICATIONS

Derwent Abstracts Ref. 68-24966P.

*Primary Examiner*—Bernard Lipman
*Attorney, Agent, or Firm*—Wenderoth, Lind & Ponack

[57] ABSTRACT

New polypropylenes which are obtained by chemical degradation of elastic polypropylenes using organic peroxides.

15 Claims, No Drawings

POLYPROPYLENES OBTAINABLE BY CHEMICAL DEGRADATION

This application is a continuation of now abandoned application Ser. No. 08/253,303, filed Jun. 3, 1994.

The invention relates to new polypropylenes which have been improved properties and are obtained by chemical degradation with peroxides.

U.S. Pat. No. 4,335,225, U.S. Pat. No. 4,522,982 and U.S. Pat. No. 5,118,768 describe elastic polypropylenes which are obtainable by polymerization by means of special catalysts. Although these products have a certain elasticity, they are unsuitable for many uses because of their rigidity. If polypropylenes which are both flexible and elastic are required for specific fields of use, it is possible, for example, to admix elastomers with the polypropylenes, for example amorphous copolymers based on ethylene and propylene (EPR) or ethylene/propylene/diene monomers (EPDM). However, these blends have the disadvantage that they have very high viscosities, and accordingly have poor flow properties and can be processed with difficulty or only with the addition of plasticizers.

There was accordingly the object of avoiding the disadvantages of the known polypropylenes and of providing polypropylenes which have an optimum profile of properties and in particular are both flexible and elastic and are also free-flowing. Such new polypropylenes can be obtained according to the invention by chemical degradation of elastic polypropylenes.

The invention accordingly relates to new polypropylenes having an improved profile of properties which are obtained by chemical degradation of elastic polypropylenes or mixtures of polypropylenes and elastic polypropylenes by means of organic peroxides, if appropriate with addition of stabilizers.

The invention furthermore relates to a process for the preparation of new polypropylenes having an improved profile of properties, in which elastic polypropylenes or mixtures of polypropylenes and elastic polypropylenes are degraded by means of organic peroxides, if appropriate with the addition of stabilizers.

The fact that, by chemical degradation according to the invention of elastic polypropylenes, products which have a low molecular weight and lower viscosity and which are both more elastic and extensible and also more flexible and less rigid than the starting polypropylenes are obtained is particularly surprising, since polypropylenes of low molecular weight or high flowability, precisely conversely, are more rigid and less flexible and less elastic or less extensible than comparable materials of high molecular weight.

The elastic polypropylenes employed for the degradation are, in particlar, those such as are described in U.S. Pat. No. 4,335,225, U.S. Pat. No. 4,522,982 and U.S. Pat. No. 5,188,768. By these are to be understood both homopolymers and copolymers. They essentially have a stereoregular block arrangement in the chain build-up and comprise, for example, blocks of isotactic and atactic propylene sequences arranged in alternation in the polymer chain. The incorporation of additional comonomers into the polymer chain is also possible. In addition to propylene units, the copolymers can also contain other olefin units, such as, for example, units of ethylene, butene, pentene or hexene, in the molecule. They are prepared, for example, in accordance with U.S. Pat. No. 4,335,225, by polymerization with special catalysts which are obtained by reaction or mixing of organic Ti, Zr or Hf compounds with a metal oxide, such as, for example, $Al_2O_3$, $TiO_2$, $SiO_2$ or MgO. The elastic polypropylenes preferably comprise an ether-soluble content of 10–80% by weight. They preferably have a flowability of less than 0.1 g/10 minutes (melt flow index/MFI 230° C., 2.16 kg in accordance with ISO 1133/DIN 53735). The elastic polypropylenes employed for the degradation furthermore can also be prepared analogously to U.S. Pat. No. 4,522,982 with the aid of metallocene catalysts in combination with aluminoxanes, or analogously to U.S. Pat. No. 5,118,768 with catalysts based on magnesium alkoxides and tetravalent titanium chloride in the presence of special electron donors.

The elastic polypropylenes can be degraded according to the invention by themselves or as a mixture with other polypropylenes. All the known propylene homopolymers and copolymers with other olefins can be employed as the other polypropylenes. The mixtures preferably comprise elastic polypropylenes having a content of 0 to 80% by weight of other polypropylenes.

Possible organic peroxides are, for example, di-tert-butyl peroxide, benzoyl peroxide, lauryl peroxide, cyclohexanone peroxide, tert-butyl-peroxy-isopropyl carbonate, 2,5-dimethyl-2,5-bis(tert-butylperoxy)-hex-3-ine, 1,1,4,4,7,7-hexamethyl-cyclo-4,7-diperoxynonane, 1,3-bis-(tert-butylperoxy-isopropyl)-benzene, 3,3,6,6,9,9-hexamethylcyclo-1,2,4,5-tetraoxanonane, 2,5-dimethyl-2,5-bis-(tert-butylperoxy)-hexane and phthalide peroxides, for example 3-phenyl-3-tert-butyl-peroxy-phthalide, such as are described, for example, for chemical degradation of customary polypropylenes in DE-B 23 31 354. Di-tert-butyl peroxide and bis(2(1,1-dimethylethyl)peroxyisopropyl) benzene, such as is commercially obtainable, for example, as Perkadox 14SFI from. Akzo, are particularly preferably employed. The peroxides are employed in an amount of about 0.001 to 0.8% by weight, preferably 0.05 to 0.5% by weight, based on the total amount of polypropylenes and elastic polypropylenes.

The degradation takes place particularly well at temperatures of 180° to 260° C., temperatures of 190° to 240° C. being particularly preferred. The duration of the treatment with the peroxides is at least 10 seconds, and is preferably 0.5 to 2 minutes. The degradation is carried out particularly easily and efficiently in a continuous manner, for example in an extruder or in a continuous kneader.

According to the invention, it is also possible to add the customary additives and/or fillers to the polypropylenes. Additives which can be added are, for example, stabilizers and lubricants. Possible stabilizers are, for example, antioxidants, processing stabilizers, long-term stabilizers or light stabilizers. Stabilizers which prove to be particularly readily compatible with the peroxides are, for example according to DE-AS 23 31 354 or EP-B-0 290,386,beta-(3, 5-di-tert-butyl-4-hydroxy-phenyl)-propionic acid, and in particular esters thereof with pentaerythritol or octadecanol, 1,3,5-trimethyl-2,4,6-tris(3',5'-di-tert-butyl-4'-hydroxyphenyl)-benzene, 4-hydroxy-methyl-2,6-di-tert-butyl-phenol, tris-(2'-methyl-4'-hydroxy-5'-tert-butylphenyl)-butane, 2,6-di-tert-butyl-p-kresol, 3,5-dimethyl-4-hydroxy-benzyl-thioglycolic acid stearyl ester and the compound which is the 2:1 Ni complex of 3,5-di-tert-butyl-4-hydroxybenzyl-phosphonic acid monoethylate, 2-(2'-hydroxy-3',5'-di-tert-amyl-phenyl)-benzotriazole and 2-(2'-hydroxy-3',5'-di-tert-butyl-phenyl)-5-chloro-benzotriazole, as well as 2-hydroxy-4-beta-octyloxy-benzophenone. It is moreover also possible to employ other stabilizers, for example from the group comprising primary or secondary antioxidants or from the group comprising light stabilizers and heat stabilizers and combinations thereof. Preferred stabilizers are 2,6-di-tert-butyl-4-methylphenol, pentaerythrityl tetrakis-(3-(3,5-di-tert-butyl-4-hydroxy-phenyl)-propionate), tris-(2,4-di-tert-butyl-phenyl) phosphite and tetrakis-(2,4-di-tert-butyl-phenyl) 4,4'-biphenylene-diphosphonite and their mixtures.

In addition, in many cases it may be necessary to add lubricants or mould release agents to facilitate processability. Suitable such compounds are, generally, salts of higher carboxylic acids, such as, for example, stearic acid, with metals of main group 2 or sub-group 2 of the Periodic Table. Preferred lubricants are calcium stearate or zinc stearate.

Possible fillers are all the known inorganic or organic fillers, such as, for example, chalk, talc, kaolin, mica or wood flour.

EXAMPLE 1

Preparation of an Elastic Polypropylene (ELPP)

a) Preparation of the Catalyst 44.22 g of a gray-brown tetraneophylzirconium (TNZ; Tm=66° C., Du Pont) were dissolved at 20° C. in an inert gas flask under extra pure nitrogen in 620 ml of n-hexane purified by means of a Cu catalyst (BASF catalyst R3-11 at 70° C.) for removal of oxygen and a 4A or 10A molecular sieve for removal of water and polar impurities. After the majority of the insoluble residue had settled, the resulting suspension was filtered after 15 minutes over a glass frit into a stirred inert gas glass flask cooled to −40° C. (heated thoroughly at above 150° C. and flushed with extra pure nitrogen (less than 2 ppm of $O_2$)). After the end of the filtration (duration about 140 minutes), the flask was stirred at −40° C. for a further 15 minutes to precipitate the TNZ as quantitatively as possible. After the TNZ had settled, the supernatant solution was filtered by means of a filter candle under an increased $N_2$ pressure into another cooled inert gas flask. The TNZ which remained was dissolved in a further 350 ml of n-hexane at about 5°–10° C. in the course of 15 minutes and, after cooling to −34° C., was precipitated again.

After the TNZ precipitate had settled, the solution was filtered again by means of an increased $N_2$ pressure over a glass filter candle into the cooled inert gas flask with the first mother liquor. The TNZ was then dried by application of an oil pump vacuum (below $1.10^{-2}$ mbar) over cold traps connected in series and cooled with liquid nitrogen. The purified TNZ had a melting point of 68° C. and was white to cream-colored. The collected mother liquors were concentrated to about 200 ml and the TNZ still dissolved was precipitated by cooling to −40° C. After renewed pressure filtration over a filter candle, the TNZ was dissolved again in 100 ml of hexane, precipitated again at −40° C., filtered off and dried by means of a vacuum as above. The total yield of this purification process was 82.2%. All the operations were carried out under extra pure nitrogen.

266.7 g of conditioned $Al_2O_3$ (Alumina C from DEGUSSA, conditioned at about 800°–1000° C. in a stream of $N_2$ and after storage at a relative atmospheric humidity of 50% and 23° C. for 16 hours and renewed drying to establish an optimum hydroxyl concentration on the surface of about 1 mmol/g of Alumina C, at 400° C. in a stream of nitrogen) were weighed into a 6 1 4-necked inert gas flask, and 5035 ml of n-hexane, purified by means of BASF catalyst R3-11 and a 4A or 10A molecular sieve, were added. The suspension was stirred at 300 revolutions/minute for about 1 hour. The 33.23 g of TNZ prepared above (without the product from the worked-up mother liquor) were then dissolved in 465 ml of n-hexane (purified as above) at 20° C. and this TNZ solution was initially added dropwise, with continuous stirring, to the $Al_2O_3$ suspension in the course of 50 minutes, a significant reduction in the viscosity of the suspension occurring after addition of a few ml of TNZ solution. After the TNZ solution had been added, the speed of rotation was reduced to about 120 revolutions/minute and the mixture was stirred for a further 12.5 hours with protection from light. To accelerate the filtration, the resulting catalyst solid was allowed to settle for 1 hour, and the solution was finally separated off by means of pressure filtration over a glass frit (duration 3 hours). The catalyst solid was then dried to a constant weight of 292 g by application of a vacuum of below $1.10^{-2}$ mbar (oil diffusion pump with two cold traps connected in series and cooled with liquid nitrogen), while stirring (duration about 5 hours). All the operations were carried out under extra pure nitrogen. The resulting TNZ/$Al_2O_3$ catalyst had a beige to pale brown coloration and was a free-flowing powder which had a tendency to form small beads of approximately 1 mm diameter. The Zr content was 1.66% by weight.

b) Polymerization

After three propene/vacuum flushing cycles, a 20 l double-walled reactor which had been heated thoroughly at 160° C. under 0.1 mbar and had a wall-flush surface-polished stirrer, thermostatically controlled jacket and temperature, speed of rotation and torque measurement was filled with 7.3 kg of propene at 25° C. After the stirrer had been raised to 400 revolutions/minute, 10.02 g of the catalyst prepared according to a) were flushed in with 300 ml of liquid propene (about 20° C.), and after 2 minutes the speed of rotation was reduced to 260 revolutions/minute. The propene temperature was then increased to 60° C. in the course of about 10 minutes and this temperature was maintained for 120 minutes from addition of the catalyst. The speed of rotation of the stirrer was then lowered to 200 revolutions/minute and 1880 g of acetone, preheated to about 50° C., were introduced into the reactor by means of an increased nitrogen pressure in the course of 3 minutes. After the speed of rotation of the stirrer had been increased to 400 revolutions/minute for about 2 minutes and then reduced to 100 revolutions/minute, the propene which had not been consumed was flashed off at 60° to 46° C. in the course of 20 minutes. The ELPP (elastomeric polypropylene)-acetone slurry which remained was stirrable and could be discharged from the reactor via the 1-inch bottom outlet.

After filtration of the ELPP and drying in a stream of nitrogen at 50° C., 1.88 kg of a powdery/crumbly, non-tacky ELPP having a melting point (Tm) of 148.1° C. (measured with a Du Pont 910/20 differential scanning calorimeter (Thermal Analyst 2100)), corresponding to a balanced Zr content of 89 ppm and an $Al_2O_3$ content of 0.49% by weight, were obtained.

EXAMPLE 2

Chemical Degradation

The elastic polypropylene obtained according to Example 1 was ground on a crushing mill, after cooling to below 0° C., down to a particle size of less than 3 mm. 0.018% by weight of bis(2(1,1-dimethylethyl)peroxyisopropyl)benzene (Perkadox 14SFI, Akzo), based on the amount of polypropylene, was then mixed in and the mixture was melted on an 18 mm Brabender single-screw extruder at 220° C. and extruded with an output rate of 1 kg/hour via a circular die to a strand of 3 mm diameter. The residence time in the extruder was about 1 minute. After solidification in a water bath, the strand was granulated. In this operation, the elastic polypropylene was degraded down to an MFI of 0.20 g/10 minutes. The MFI was measured in accordance with ISO 1133/DIN 53735 at 230° C./2.16 kg. The mechanical characteristics of the polypropylene obtained were determined in a tensile test on tensile specimen F4 in accordance with DIN 53 457/1987. The test specimens required were produced in accordance with DIN 16774/1988 at a material temperature of 250° C. and a mould temperature of 30° C. The values obtained for the modulus of elasticity (E modulus), the elongation at break and the MFI are summarized in Table 1.

EXAMPLES 3 TO 6

The elastic polypropylene obtained according to Example 1 was degraded analogously to Example 2, but the higher amounts of peroxide shown in Table 1 were employed. The kneader temperature had to be lowered here down to 190° C. as the MFI increased, in order to obtain a smooth strand which was easy to draw off. The values for the E modulus, the elongation at break, the MFI and the values calculated in accordance with the Cox/Metz relationship (compare W. P. Cox, E. Metz, J. Pol. Sci 28 (1958) 619) for the zero viscosity of the polypropylenes obtained by the degradation are also summarized in Table 1.

EXAMPLES 7 TO 9

The elastic polypropylene obtained according to Example 1 was mixed with a conventional isotactic polypropylene powder (homopolymer, MFI 230° C./2.16 kg: 0.2 g/10 minutes, Daplen BE 50, PCD Polymere) in a ratio of 1:1 with the addition of in each case 0.1% by weight of Irganox 1010 and Irgafos 168 (Ciba-Geigy) as stabilizers and the mixture was then degraded to various MFI values analogously to Example 2 but with different amounts of peroxide, as shown in Table 1. The % by weight of peroxide and stabilizers relate to the total amount of polypropylenes employed. The values for the E modulus, the elongation at break, the MFI and the zero viscosity furthermore are summarized in Table 1.

EXAMPLES 10 AND 11

The elastic polypropylene obtained according to Example 1 was mixed with a conventional polypropylene powder (block copolymer with 12 mol % of ethylene, MFI 230° C./2.16 kg : 0.2 g/10 minutes, Daplen BHC 1012, PCD Polymere) in a ratio of 1:1 with the addition of in each case 0.1% by weight of Irganox 1010 and Irgafos 168 (Ciba-Geigy) as stabilizers and the mixture was then degraded to various MFI values analogously to Example 2, but with different amounts of peroxide, as shown in Table 1. The % by weight of peroxide and stabilizers relate to the total amount of polypropylenes employed. The values for the E modulus, the elongation at break, the MFI and the zero viscosity furthermore are summarized in Table 1.

TABLE 1

Properties of the elastic polypropylenes and their mixtures with conventional polypropylenes as a function of the degree of degradation

| Ex. | Peroxide (% by wt) | MFI (g/10 min) | Zero viscosity (Pa · s) | E modulus (MPa) | Elongation at break (%) |
|---|---|---|---|---|---|
| 1 | — | less than 0.01 | $2.10 \cdot 10^6$ | 42.8 | 131 |
| 2 | 0.018 | 0.20 | $5.50 \cdot 10^5$ | 27.8 | 497 |
| 3 | 0.040 | 0.97 | $1.30 \cdot 10^4$ | 25.1 | 500 |
| 4 | 0.080 | 3.70 | $3.10 \cdot 10^3$ | 23.8 | 664 |
| 5 | 0.18 | 15.5 | $7.50 \cdot 10^2$ | 23.5 | 845 |
| 6 | 0.25 | 32.0 | $4.50 \cdot 10^2$ | 21.9 | 1072 |
| 7 | 0.060 | 3.5 | $3.30 \cdot 10^3$ | 172.5 | 590 |
| 8 | 0.098 | 11.7 | $9.10 \cdot 10^2$ | 168.3 | 679 |
| 9 | 0.15 | 26.0 | $4.50 \cdot 10^2$ | 163.5 | 733 |
| 10 | 0.07 | 4.8 | $2.00 \cdot 10^3$ | 231 | 709 |
| 11 | 0.10 | 10.3 | $9.50 \cdot 10^2$ | 227 | 760 |

As can be seen from Table 1, the elastic polypropylenes obtained by the degradation and mixtures thereof with conventional polypropylenes show, as the viscosity decreases (correspondingly increasing MFI), an increase in the elongation at break as a measure of the elastic properties and a decrease in the E modulus as a measure of the rigidity. The resulting polypropylenes accordingly become increasingly both more elastic and more flexible as the MFI increases. This is particularly surprising, since in contrast, in conventional polypropylenes—as summarized in Table 2—the E modulus increases and the elongation at break decreases as the MFI increases.

TABLE 2

Properties of conventional polypropylenes

| | MFI (g/10 min) | E modulus (MPa) | Elongation at break (%) |
|---|---|---|---|
| Daplen BM55 (PCD Polymere) | 0.4 | 1436 | 705 |
| Daplen DS10 (PCD Polymere) | 2.4 | 1582 | 449 |
| Daplen us 105A (PCD Polymere) | 50 | 1806 | 94 |

What we claim is:

1. Polypropylenes which are obtained by chemical degradation of elastic polypropylenes by means of organic peroxides, wherein said elastic polypropylenes have a stereoregular block arrangement in the polymer chain.

2. Polypropylenes according to claim 1 wherein the elastic polypropylenes employed for the degradation have an MFI (230° C./2.16 kg) of less than 0.1 g/10 minutes.

3. Polypropylenes according to claim 1, wherein bis(2(1, 1-dimethylethyl)peroxyisopropyl)-benzene or di-tert-butyl peroxide are employed as peroxides.

4. Polypropylenes according to claim 1, wherein 2,6-di-tert-butyl-4-methyl-phenol, pentaerythrityl tetrakis-(3-(3,5-di-tert-butyl-4-hydroxy-phenyl)-propionate), tris-(2,4-di-tert-butyl-phenyl) phosphite or tetrakis-(2,4-di-tert-butyl-phenyl) 4,4'-biphenylene-diphosphonite or mixtures thereof are employed as stabilizers.

5. Process for the preparation of polypropylenes which comprises degrading elastic polypropylenes by means of organic peroxides, wherein said elastic polypropylenes have a stereoregular block arrangement in the polymer chain.

6. Process according to claim 5, wherein 0.05 to 0.5% by weight of peroxides, based on the amount of polypropylenes, are used.

7. Process according to claim 5, wherein the degradation is carried out at temperatures of 190° to 240° C.

8. Process according to claim 5, wherein the degradation is carried out continuously in an extruder.

9. Polypropylenes according to claim 1 which contain fillers.

10. Polypropylenes according to claim 1 which contain additives.

11. Polypropylenes according to claim 5 which contain fillers.

12. Polypropylenes according to claim 5 which contain additives.

13. Process according to claim 5, wherein said elastic polypropylenes have a stereoregular block arrangement comprising alternating blocks of isotactic and atactic propylene sequences in the polymer chain.

14. Polypropylenes according to claim 1, wherein said elastic polypropylenes are admixed with polypropylenes other than said elastic polypropylenes.

15. Method according to claim 5, wherein said elastic polypropylenes are admixed with polypropylenes other than said elastic polypropylenes.

* * * * *